United States Patent
Servet

(10) Patent No.: US 9,004,517 B2
(45) Date of Patent: Apr. 14, 2015

(54) BICYCLE WHEEL CARRIER ASSEMBLY WITH BUILT-IN BRAKE

(75) Inventor: Sébastien Servet, Nevers (FR)

(73) Assignee: Look Cycle International, Nevers (FR)

( * ) Notice: Subject to any disclaimer, the term of this patent is extended or adjusted under 35 U.S.C. 154(b) by 167 days.

(21) Appl. No.: 13/540,727

(22) Filed: Jul. 3, 2012

(65) Prior Publication Data

US 2013/0009380 A1    Jan. 10, 2013

(30) Foreign Application Priority Data

Jul. 8, 2011   (FR) ..................................... 11 56220

(51) Int. Cl.

| | |
|---|---|
| *B62K 19/38* | (2006.01) |
| *B62K 21/02* | (2006.01) |
| *F16D 55/22* | (2006.01) |
| *F16D 55/30* | (2006.01) |
| *B62L 1/14* | (2006.01) |
| *B60T 1/06* | (2006.01) |
| *B60T 11/04* | (2006.01) |
| *F16D 125/60* | (2012.01) |
| *F16D 125/64* | (2012.01) |

(52) U.S. Cl.
CPC ................. *B62K 21/02* (2013.01); *B62K 19/38* (2013.01); *B62L 1/14* (2013.01); *B60T 1/06* (2013.01); *B60T 11/046* (2013.01); *F16D 55/22* (2013.01); *F16D 55/30* (2013.01); *F16D 2125/60* (2013.01); *F16D 2125/64* (2013.01)

(58) Field of Classification Search
CPC ........ B62K 19/30; B62K 19/38; B62K 21/02; B62K 21/04; B62K 25/02

USPC ................. 280/274, 275, 276, 277, 279, 280, 280/281.1, 284, 285, 288; 188/24.11, 188/24.12, 24.13, 24.16, 344

See application file for complete search history.

(56) References Cited

U.S. PATENT DOCUMENTS

| | | | | |
|---|---|---|---|---|
| 4,611,690 | A  * | 9/1986 | Schoch ....................... | 188/24.11 |
| 6,308,806 | B1 * | 10/2001 | Nielsen ...................... | 188/24.11 |
| 7,565,955 | B2 * | 7/2009 | Costa ............................ | 188/272 |
| 8,079,609 | B2 * | 12/2011 | Bell et al. ...................... | 280/279 |
| 2006/0266596 | A1 * | 11/2006 | Chen ............................... | 188/26 |
| 2007/0068744 | A1 * | 3/2007 | Tsai ........................... | 188/24.12 |
| 2007/0251780 | A1 * | 11/2007 | Lyons ............................ | 188/344 |
| 2008/0035431 | A1 * | 2/2008 | Vroomen et al. .......... | 188/24.21 |

FOREIGN PATENT DOCUMENTS

| | | |
|---|---|---|
| EP | 1518786 A1 | 3/2005 |
| EP | 1886910 A1 | 2/2008 |

OTHER PUBLICATIONS

French Search Report dated Jan. 30, 2012, from corresponding FR application No. 1156220.

* cited by examiner

*Primary Examiner* — Joseph Rocca
*Assistant Examiner* — Marc A Scharich
(74) *Attorney, Agent, or Firm* — Young & Thompson

(57) ABSTRACT

A bicycle wheel carrier assembly is equipped with a rim brake with pads (5) which is built into the structure of the carrier assembly. The rim brake includes two actuating arms (3) and two pad-bearing brake arms (4). Each actuating arm (3) associated with a pad-bearing brake arm (4) is articulated in a recess of the structure of the carrier assembly between a first position in which it is retracted within the structure and a second position providing access to the pad-bearing brake arm (4).

20 Claims, 3 Drawing Sheets

BICYCLE WHEEL CARRIER ASSEMBLY WITH BUILT-IN BRAKE

BACKGROUND OF THE INVENTION

1. Field of the Invention

The invention relates to a bicycle wheel carrier assembly equipped with pad-type rim brakes built into the structure of the carrier assembly.

The invention notably covers bicycle wheel carrier assemblies consisting of front forks.

The invention also covers bicycle wheel carrier assemblies that form part of the bicycle frame, for example the chain stays or the seat stays.

2. Description of the Related Art

Numerous bicycle brake mechanisms that use calipers to apply the pads to the rim of a bicycle wheel through a lever effect are known.

To improve bicycle aerodynamics, manufacturers are currently tending to build the brake calipers into the bicycle frame or into the bicycle forks.

When the built-in brake is adjustable, use may be made of an aerodynamically shaped hood to protect the brake mechanism.

When the built-in brake has no possibility for adjustment, the forks and pad-bearing brake arms can be manufactured as a single piece without using an aerodynamic hood.

BRIEF SUMMARY OF THE INVENTION

One object of the invention is to improve the known state of the art by proposing a new bicycle wheel carrier assembly with built-in brake.

The subject of the invention is a bicycle wheel carrier assembly equipped with a rim brake with pads which is built into the structure of the carrier assembly, the said pad-type rim brake comprising two actuating arms and two pad-bearing brake arms, characterized in that each actuating arm associated with a pad-bearing brake arm is articulated in a recess of the structure of the assembly between a first, operating, position in which it is retracted within the structure of the carrier assembly and a second position providing access to the pad-bearing brake arm.

According to other alternative features of the invention:
an adjusting means is interposed between each actuating arm and the corresponding pad-bearing brake arm.
The actuating arms and the pad-bearing brake arms are forced against one another by return springs in the position in which the pads are released without braking the rim.
The actuating arms are connected by their second ends to an actuating means that actuates the pad-type rim brake.
The pad-type rim brake actuating means comprises a triangular component articulated to an actuating arm, connected to the other actuating arm by a tie and connected to a pull control intended to move the two actuating arms closer together upon braking.
Each actuating arm comprises a passage for an adjustment tool used to adjust the adjusting means interposed between each actuating arm and the corresponding pad-bearing brake arm.
The adjusting means interposed between each actuating arm and the corresponding pad-bearing brake arm is a screw-operated means of adjusting the contact between the pad-bearing brake arm and the actuating arm.

The adjusting means is a distancing screw mounted in the pad-bearing brake arm and accessible via an aperture made in the corresponding actuating arm.

BRIEF DESCRIPTION OF THE DRAWINGS

The invention will be better understood by virtue of the following description, given by way of nonlimiting example with reference to the attached drawings in which.

DETAILED DESCRIPTION OF THE PREFERRED EMBODIMENTS

Figure 1:
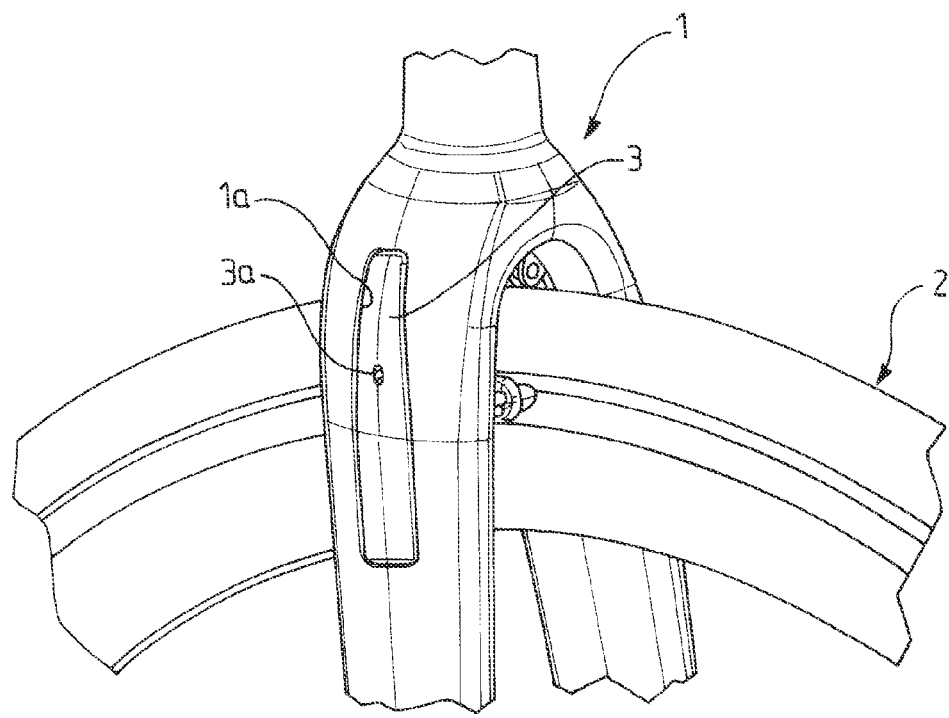
FIG. 1 is a schematic perspective view of a carrier assembly according to the invention.

With reference to FIGS. 1 to 6, elements that are identical or functionally equivalent are identified by identical reference numerals.

In FIG. 1, a bicycle wheel (2) carrier assembly (1) is configured as bicycle forks.

The invention also applies to cases in which the wheel carrier assembly is configured as part of the bicycle frame, rather than being configured as the bicycle forks.

The invention in particular and as an alternative applies to a carrier assembly consisting of chain stays comprising a built-in brake.

The invention in particular and as an alternative applies to bicycle seat stays comprising a built-in brake.

The bicycle wheel (2) carrier assembly (1) comprises, on each side of the bicycle wheel, a recess (1a) in which an actuating arm (3) is housed, aerodynamically flush therewith.

The actuating arm (3) is mounted in the recess (1a) of the carrier assembly (1) via a pivot positioned at the radially inner end of the actuating arm (3).

This arrangement allows a long lever arm for applying the brake pads to the rim of the wheel (2).

For preference, each actuating arm has a passage or aperture for adjusting an adjusting means interposed between each actuating arm and a corresponding pad-bearing brake arm.

Figure 2:
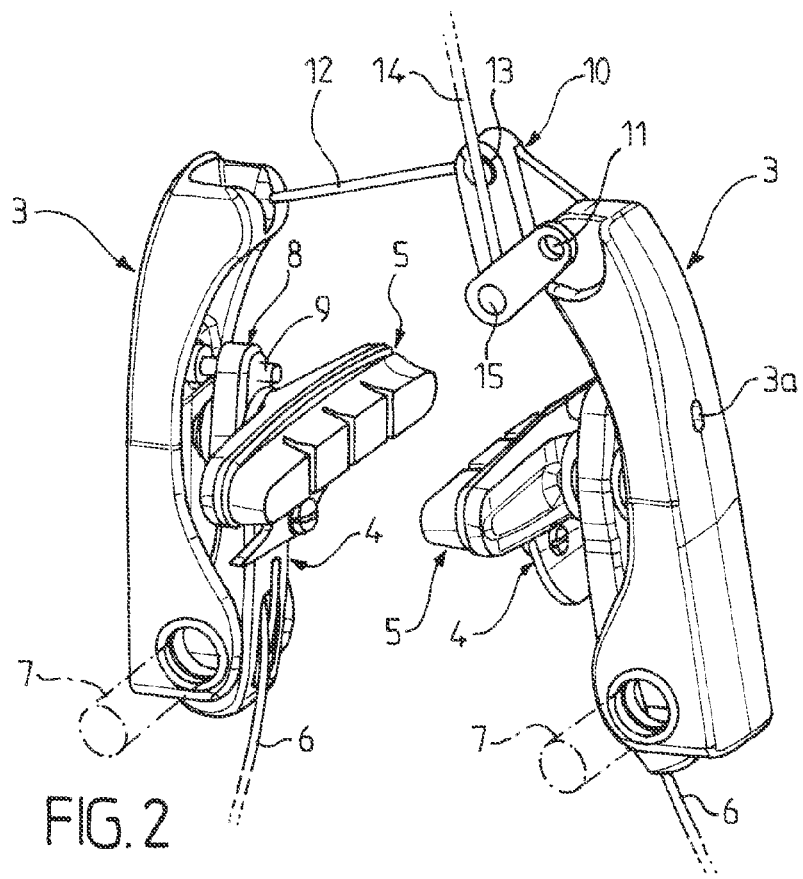
FIG. 2 is a schematic perspective view of a brake assembly intended to be fitted to a carrier assembly according to the invention.

In FIG. 2, a pad-type rim brake built into a wheel carrier assembly according to the invention comprises two actuating arms (3), two pad-bearing brake arms (4), two pads (5) and two return springs (6) forcing the pad-bearing brake arms (4) into the position in which the pads are released and do not brake the rim.

Accessories such as fastening screws and washers are provided in the known manner for mounting the brake pads (5).

An adjusting means (8) interposed between each actuating arm (3) and the corresponding pad-bearing brake arm (4) is provided for adjusting the separation and contact between actuating arm (3) and pad-bearing brake arm (4).

The adjusting means interposed between each actuating arm (3) and the corresponding pad-bearing brake arm (4) is advantageously a screw-operated means of adjusting the contact between pad-bearing brake arm (4) and actuating arm (3).

In the example depicted, this adjusting means is a distancing screw (9) mounted in the pad-bearing brake arm (4) and having a head that is accessible through the aperture (3a) made in the corresponding actuating arm (3).

The adjusting means may also consist of an eccentric cam, an insert of predetermined size to be positioned between the two arms or any other means that positions the actuating arm (3) and the pad-bearing brake arm (4) against the return spring (6).

The radially outer ends of the actuating arms (3) are connected to one another and to an actuating means that actuates the pad-type rim brake.

The pad-type rim brake actuating means preferably comprises a triangular component (10) articulated to an actuating arm (3) by a pivot (11). The triangular component (10) is connected to the other actuating arm (3) by a tie (12) mounted on a journal (13) and is connected to a pull control (14) by another journal (15).

The pull control (14) may be a mechanical control, a hydraulic control or an electrical control.

The pull control (14) applies an upward force that has a tendency to pivot the triangular component (10) in the direction that causes the upper ends of the actuating arms (3) to move closer together.

Figure 3:
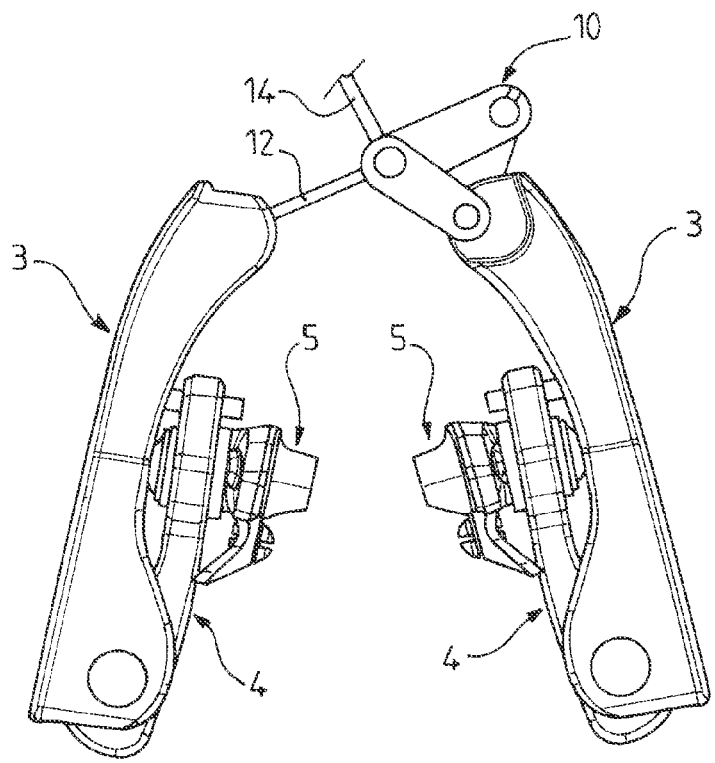
FIG. 3 is a schematic partial front view of a brake assembly in the braking position.

In FIG. 3, the built-in pad-type rim brake according to the invention is depicted in the braking position.

In this braking position, the triangular component (10) is pivoted upward about the pivot (11) and causes the tie (12) to move, bringing the upper ends of the actuating arms (3) closer together.

The actuating arms (3) press on the pad-bearing brake arms (4) to apply load via the pads (5) to the wheel rim, not depicted, and thus bring about braking.

Figure 4:
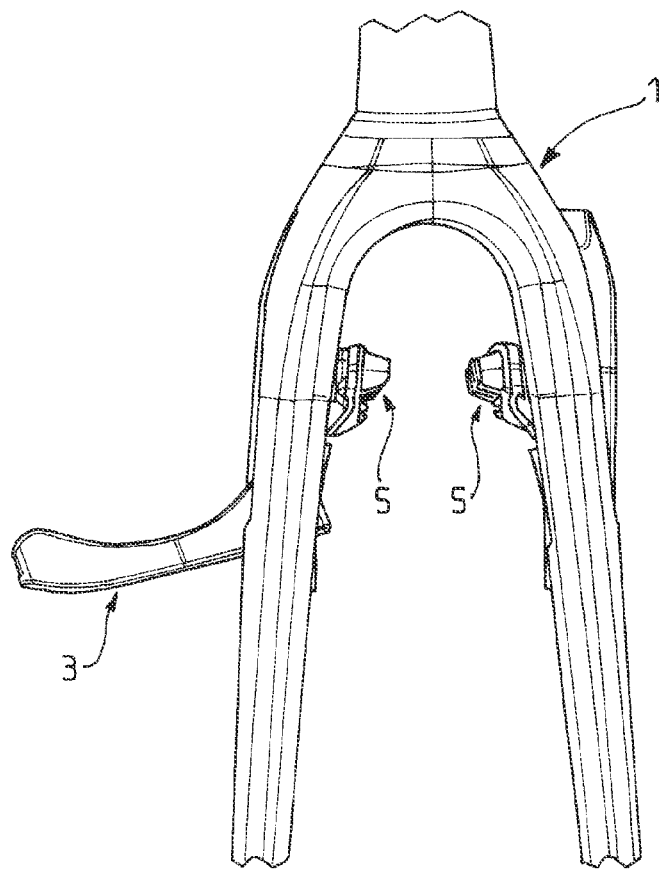
FIG. 4 is a schematic depiction of a carrier assembly in the position providing access to a pad-bearing brake arm.

In FIG. 4, the tie (12) has been disconnected in order to release one actuating arm (3).

Manually flipping down the actuating arm (3) provides access to the recess (1a) of the wheel carrier assembly according to the invention.

Having this access available allows intervention on the screws that attach the pad (5) so that the pad can be replaced or adjusted with respect to the pad-bearing brake arm (4).

Figure 5:
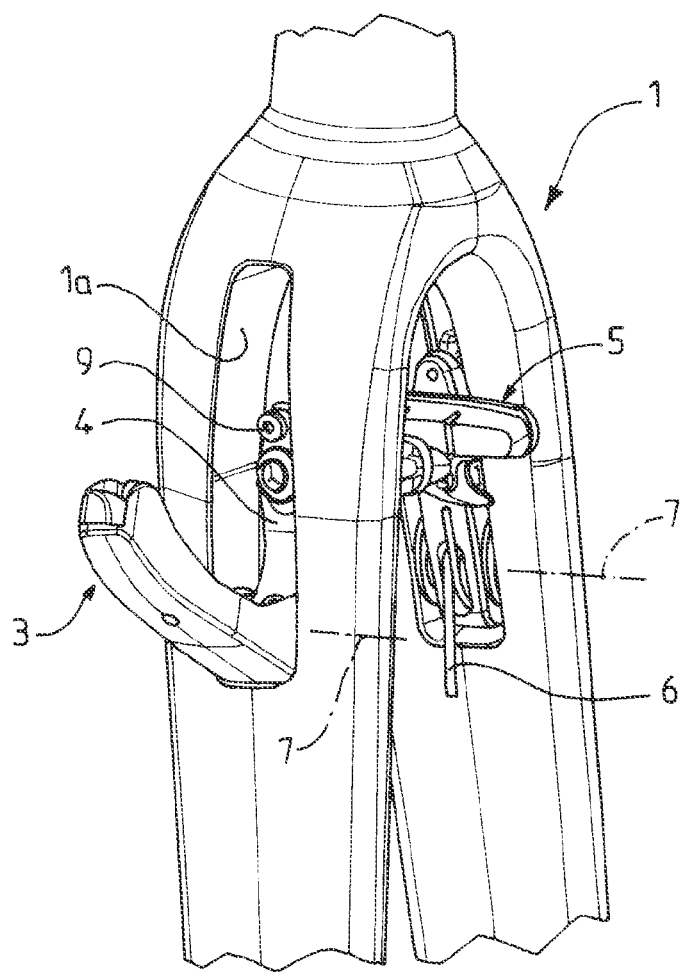
FIG. 5 is a schematic perspective view of a carrier assembly in a position similar to the position of FIG. 4.

FIG. 5 depicts a wheel carrier assembly of the invention in a part-open position.

The part-open position provides access to a pad-bearing brake arm (4), inside the recess (1a).

Because the pad-bearing brake arms and the actuating arms are articulated about a pivot (7) with relative freedom to move with respect to one another, it is possible for an actuating arm (3) to be flipped down manually without interfering with the adjustment of the pad-bearing brake arms (4).

This arrangement makes it possible both to guarantee aerodynamic streamlining since the pad-bearing brake arms (4) and the actuating arms (3) are retracted inside the outline of the legs of a carrier assembly according to the invention, and to avoid interference with the adjustment of the pad-bearing brake arm (4), which thus becomes independent of the adjustment of how the pad-bearing brake arm (4) and actuating arm (3) press against one another.

The wheel carrier assembly according to the invention can thus be adjusted in two phases: first of all, the pad-bearing brake arms (4) and the pads (5) are adjusted to ensure correct positioning relative to the rim of the wheel that is to be braked, and then the relative position of the actuating arms (3) and of the pad-bearing brake arms (4) is adjusted using the adjusting means (8) to ensure that the arms lie flush inside the outline of a carrier assembly according to the invention.

The return spring (6) that returns the pads to the released position in which they do not brake the rim prevents the pad-bearing brake arms (4) from pivoting towards the wheel that is to be braked.

The pressure applied by the actuating arms (3) to the pad-bearing brake arms (4) via a distancing screw (9) then allows the aerodynamics of the exterior outline of a carrier assembly according to the invention to be adjusted.

Figure 6:
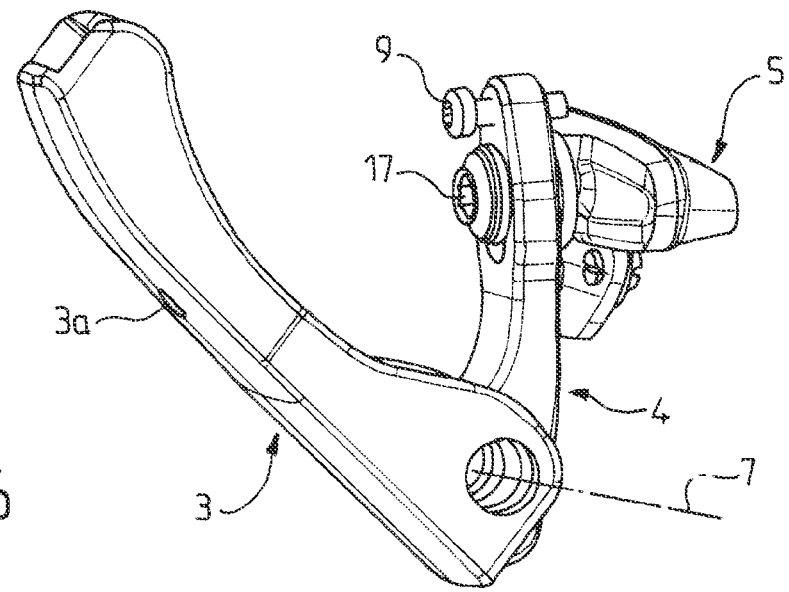
FIG. 6 is a schematic partial view illustrating the assembling of an actuating arm and of a pad-bearing brake arm.

FIG. 6 depicts the arrangement of an actuating arm (3) with a pad-bearing brake arm (4) in greater detail.

The adjusting screw (9) that adjusts the separation and contact is positioned above a mounting screw (17) used for fitting the pad (5), to provide centring by virtue of the head of the screw (9) being housed in a corresponding shape in the actuating arm (3).

The hexagonal socket of the screw (9) is accessible through the aperture (3a) made in the actuating arm (3).

The lever arm of the actuating arm (3) is approximately twice the length of the lever arm between the pivot (7) and the point at which the pad (5) acts on the rim of the wheel, not depicted.

This arrangement means that a high braking force can be obtained during braking by urging the actuating arms (3) towards one another, while at the same time maintaining, thanks to the invention, the sought-after aerodynamic streamlining.

The fact that the adjustments for the pad-bearing brake arm and for the actuating arm are independent of one another also adds to the ease of replacing the pad and to cyclist safety.

The invention described with reference to one particular embodiment is not in any way restricted thereto but on the contrary covers any modification to form and any alternative form of embodiment that falls within the scope of the attached claims.

The invention claimed is:

1. A carrier assembly (1) for a bicycle wheel (2), comprising:
a structure (1) configured for placement adjacent the bicycle wheel (2);
two recesses (1a), a first of the two recesses (1a) being located on a first outside surface of the structure (1) and a second of the two recesses (1a) being located on an opposite, second outside surface of the structure (1);
a rim brake with brake pads (5) built into the structure (1), the rim brake comprising two actuating arms (3) and two pad-bearing brake arms (4),
wherein each of the two actuating arms (3) is housed within a corresponding one of the two recesses (1a),
wherein each actuating arm (3) comprises a first end and an opposite second end and each pad-bearing brake arm (4) comprises a first end and an opposite second end, each actuating arm (3) being an arm independent from a corresponding one of the pad-bearing brake arms (4),
wherein the first end of each actuating arm (3) is operably connected with the first end of the corresponding one of the two pad-bearing brake arms (4) and is movable within the corresponding one of the recesses (1a),
wherein a corresponding one of the brake pads (5) is mounted at the second end of each pad-bearing brake arm (4), and
wherein each actuating arm (3) is configured to move between a first, operating position in which the actuating arm (3) is retracted within the corresponding recess (1a), and a second position with the actuating arm (3) extending outside the outside surface of the structure (1) in a position which enables access to the pad-bearing brake arm (4) through the corresponding recess (1a).

2. The carrier assembly according to claim 1, wherein an adjusting means (8) for adjusting contact between the actuating arm (3) and the corresponding pad-bearing brake arm (4) is interposed between each actuating arm (3) and the corresponding pad-bearing brake arm (4).

3. The carrier assembly according to claim 2, wherein the adjusting means (8) interposed between each actuating arm (3) and the corresponding pad-bearing brake arm (4) is a screw-operated means for adjusting the contact between the pad-bearing brake arm (4) and the actuating arm (3).

4. The carrier assembly according to claim 3, wherein the adjusting means (8) comprises a distancing screw (9) mounted in the pad-bearing brake arm (4) and is accessible via an aperture (3a) provided in the corresponding actuating arm (3).

5. The carrier assembly according to claim 2, wherein each actuating arm (3) comprises an aperture (3a) for receiving an adjustment tool used to adjust the adjusting means (8) interposed between each actuating arm (3) and the corresponding pad-bearing brake arm (4).

6. The carrier assembly according to claim 2, wherein the actuating arms (3) and the corresponding pad-bearing brake arms (4) are forced against one another by return springs (6) such that the brake pads (5) are caused to be released from a rim of the bicycle wheel (2) when the rim brake is not actuated.

7. The carrier assembly according to claim 2, wherein the second ends of each of the actuating arms (3) are connected to an actuating means (14) that actuates the rim brake.

8. The carrier assembly according to claim 1, wherein the actuating arms (3) and the corresponding pad-bearing brake arms (4) are forced against one another by return springs (6) such that the brake pads (5) are caused to be released from a rim of the bicycle wheel (2) when the rim brake is not actuated.

9. The carrier assembly according to claim 1, wherein the second ends of each of the actuating arms (3) are connected to an actuating means (14) that actuates the rim brake.

10. The carrier assembly according to claim 9, wherein the rim brake actuating means (14) comprises a triangular component (10) pivotally connected to one of the actuating arms (3), and operably connected to the other actuating arm (3) by a tie (12), and wherein the rim brake actuating means (14) is further connected to a pull control (14) which causes the two actuating arms (3) to move closer together upon braking a rim of the bicycle wheel (2).

11. The carrier assembly according to claim 1, wherein a mounting screw (17) mounts the corresponding brake pad (5) at the second end of each of the pad-bearing brake arms (4).

12. The carrier assembly according to claim 11, wherein each actuating arm (3) is operably connected with the corresponding pad-bearing brake arm (4) about a pivot (7) such that i) each pad-bearing brake arm and the corresponding actuating arm are articulated about the pivot (7) with relative freedom to move with respect to one another and ii) each actuating arm (3) is operable to be flipped down manually without interfering with adjustment of the pad-bearing brake arm (4).

13. The carrier assembly (1) of claim 1, wherein each of the two actuating arms (3) is housed aerodynamically flush within the corresponding one of the two recesses (1a).

14. A carrier assembly (1) for a bicycle wheel (2), comprising:
a fork structure (1) comprising a first fork and a second fork, the first and second forks configured for placement at opposite sides of the bicycle wheel (2);
two recesses (1a), a first of the two recesses (1a) being located in the first fork and extending through the first fork between a first outside surface of the first fork to an opposite second outside surface of the first fork, and a second of the two recesses (1a) being located in the second fork and extending through the second fork between a first outside surface of the second fork to an opposite second outside surface of the second fork;
a rim brake comprising two actuating arms (3) supporting two pad-bearing brake arms (4), each of the two pad-bearing brake arms (4) supporting a corresponding brake pad (5),
wherein a first of the two actuating arms (3) is housed within the first recess (1a) and a second of the two actuating arms (3) is housed within the second recess (1a),
wherein each actuating arm (3) is connected, via a pivot (7), with a corresponding one of the two pad-bearing brake arms (4) and is movable within the corresponding one of the first and second recesses (1a), and
wherein each actuating arm (3) is configured to move between
i) a first, operating position in which the actuating arm (3) is retracted within the corresponding recess (1a), and
ii) a second position with the actuating arm (3) extending outside the first outside surface of a corresponding one of the first and second forks in a position which enables access to the pad-bearing brake arm (4) through the corresponding recess (1a).

15. The carrier assembly according to claim 14, wherein,
an adjusting means (8) for adjusting contact between the actuating arm (3) and the corresponding pad-bearing brake arm (4) is interposed between each actuating arm (3) and the corresponding pad-bearing brake arm (4),
wherein the adjusting means (8) is a screw-operated means for adjusting the contact between the pad-bearing brake arm (4) and the actuating arm (3), and
the adjusting means (8) comprises a distancing screw (9) mounted in the pad-bearing brake arm (4) and is accessible via an aperture (3a) provided in the corresponding actuating arm (3).

16. The carrier assembly (1) of claim 14, wherein in the first, operating position, each of the two actuating arms (3) is housed aerodynamically flush within the first outside surface of the corresponding one of the first and second forks.

17. The carrier assembly (1) of claim 14,
wherein a mounting screw (17) mounts the corresponding brake pad (5) against each of the pad-bearing brake arms (4), and
wherein each actuating arm (3) is operably connected with the corresponding pad-bearing brake arm (4) about a pivot (7) such that i) each pad-bearing brake arm and the corresponding actuating arm are articulated about the pivot (7) with relative freedom to move with respect to one another and ii) each actuating arm (3) is operable to be flipped down manually without interfering with adjustment of the pad-bearing brake arm (4).

18. A carrier assembly (1) for a bicycle wheel (2), comprising:
a structure (1) for placement adjacent the bicycle wheel (2);
two recesses (1a), a first of the two recesses (1a) extending through a first part of the structure (1) and a second of the two recesses (1a) extending through an opposite, second part of the structure (1);
a rim brake comprising two actuating arms (3), each actuating arm (3), via a pivot (7), supporting a corresponding pad-bearing brake arm (4), each pad-bearing brake arm (4) having an outer surface that supports a corresponding brake pad (5), wherein a first of the two actuating arms (3) is housed within the first recess (1a) and a second of the two actuating arms (3) is housed within the second recess (1a), wherein each actuating arm (3) is movable within the corresponding one of the first and second recesses (1a), and wherein each actuating arm (3) is configured to move between i) a first, operating position in which the actuating arm (3) is retracted within the corresponding recess (1a) and pivoted toward the corresponding pad-bearing brake arm (4) such that upper portions of the actuating arm (3) and the corresponding pad-bearing brake arm (4) are spaced apart by a first distance, and ii) a second position in which the actuating arm (3) is extended outside the corresponding recess (1a) beyond an adjacent outside surface of the structure (1) in a position which enables access to the pad-bearing brake arm (4) through the corresponding recess (1a) and in which the actuating arm (3) is pivoted away from the corresponding pad-bearing brake arm (4) such that the upper portions of the actuating arm (3) and the corresponding pad-bearing brake arm (4) are spaced apart by a second distance which is greater than the first distance.

19. The carrier assembly according to claim 18, wherein,
an adjusting means (8) for adjusting contact between the actuating arm (3) and the corresponding pad-bearing brake arm (4) is interposed between each actuating arm (3) and the corresponding pad-bearing brake arm (4), wherein the adjusting means (8) is a screw-operated means for adjusting the contact between the pad-bearing brake arm (4) and the actuating arm (3), and the adjusting means (8) comprises a distancing screw (9) mounted in the pad-bearing brake arm (4) and is accessible via an aperture (3a) provided in the corresponding actuating arm (3).

20. The carrier assembly (1) of claim 18,
wherein a mounting screw (17) mounts the corresponding brake pad (5) against each of the pad-bearing brake arms (4), and wherein each actuating arm (3) is operably connected with the corresponding pad-bearing brake arm (4) about the pivot (7) such that i) each pad-bearing brake arm and the corresponding actuating arm are articulated about the pivot (7) with relative freedom to move with respect to one another and ii) each actuating arm (3) is operable to be flipped down manually without interfering with adjustment of the pad-bearing brake arm (4).

* * * * *